US 10,744,999 B2

(12) United States Patent
Jerger et al.

(10) Patent No.: US 10,744,999 B2
(45) Date of Patent: Aug. 18, 2020

(54) CONTROL SYSTEM AND METHOD OF CONTROLLING A DRIVELINE (71) Applicant: Jaguar Land Rover Limited, Coventry, Warwickshire (GB)

(72) Inventors: Rob Jerger, Coventry (GB); Russell Osborn, Coventry (GB); Christopher Harries, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 87 days.

(21) Appl. No.: 15/572,269

(22) PCT Filed: May 13, 2016

(86) PCT No.: PCT/EP2016/060861
§ 371 (c)(1),
(2) Date: Nov. 7, 2017

(87) PCT Pub. No.: WO2016/188775
PCT Pub. Date: Dec. 1, 2016

(65) Prior Publication Data
US 2018/0126978 A1     May 10, 2018

(30) Foreign Application Priority Data

May 26, 2015   (GB) .................................. 1508962.6

(51) Int. Cl.
*B60W 20/15*     (2016.01)
*B60W 10/08*     (2006.01)
(Continued)

(52) U.S. Cl.
CPC ............. *B60W 20/15* (2016.01); *B60K 23/08* (2013.01); *B60K 23/0808* (2013.01);
(Continued)

(58) Field of Classification Search
CPC .... B60W 10/119; B60W 10/08; B60W 20/40; B60W 20/15; B60W 30/182; B60K 23/08; B60K 23/0808
See application file for complete search history.

(56) References Cited

U.S. PATENT DOCUMENTS 5,797,664 A    8/1998  Tagawa
6,406,105 B1   6/2002  Shimada et al.
(Continued)

FOREIGN PATENT DOCUMENTS

CN    103517818 A    1/2014
EP    1 627 763 A2   2/2006
(Continued)

OTHER PUBLICATIONS

Office Action and English language Summary, JP Application No. 2017-556880, dated Aug. 9, 2018, 7 pp.
(Continued)

*Primary Examiner* — Erin D Bishop
(74) *Attorney, Agent, or Firm* — Reising Ethington P.C.

(57) ABSTRACT

A control system that controls a driveline of a motor vehicle to operate in a selected one of a plurality of configurations is configured to receive a brake signal responsive to the application of a braking system. The control system causes the driveline to operate in a second configuration and not a first configuration in dependence at least in part on the brake signal. In the first configuration a first group of one or more wheels and in addition a second group of one or more wheels are arranged to be driven by the driveline, and in the second configuration the first group of one or more wheels and not the second group are arranged to be driven by the driveline.

20 Claims, 4 Drawing Sheets (51) Int. Cl.
*B60W 10/119* (2012.01)
*B60W 30/182* (2020.01)
*B60K 23/08* (2006.01)
*B60W 30/18* (2012.01)

(52) U.S. Cl.
CPC .......... *B60W 10/08* (2013.01); *B60W 10/119* (2013.01); *B60W 30/182* (2013.01); *B60W 30/18127* (2013.01); *B60K 2023/0825* (2013.01); *B60K 2023/0833* (2013.01); *B60K 2023/0858* (2013.01); *B60W 2510/18* (2013.01); *B60W 2510/244* (2013.01); *B60W 2540/10* (2013.01); *B60W 2540/12* (2013.01); *B60W 2710/06* (2013.01); *B60W 2710/08* (2013.01); *B60W 2710/18* (2013.01); *B60W 2720/26* (2013.01); *B60Y 2400/421* (2013.01); *B60Y 2400/4244* (2013.01); *Y10S 903/915* (2013.01); *Y10S 903/947* (2013.01)

(56) References Cited

U.S. PATENT DOCUMENTS

| | | | |
|---|---|---|---|
| 8,465,107 B2* | 6/2013 | Lloyd | B60T 1/10 303/127 |
| 8,700,241 B2* | 4/2014 | Yoshimura | B60K 6/445 701/22 |
| 2003/0200016 A1 | 10/2003 | Spillane et al. | |
| 2014/0051546 A1 | 2/2014 | Maruyama et al. | |
| 2014/0074368 A1* | 3/2014 | Stares | B60K 17/34 701/69 |
| 2016/0347171 A1 | 12/2016 | Ogawa et al. | |

FOREIGN PATENT DOCUMENTS

| | | |
|---|---|---|
| EP | 2 634 033 A1 | 9/2013 |
| GB | 2 325 716 A | 12/1998 |
| GB | 2 308 415 B | 2/1999 |
| GB | 2 341 430 A | 3/2000 |
| GB | 2 381 597 A | 5/2003 |
| GB | 2 382 158 A | 5/2003 |
| GB | 2 407 804 A | 5/2005 |
| GB | 2488155 A | 8/2012 |
| GB | 2488243 A | 8/2012 |
| GB | 2492655 A | 1/2013 |
| GB | 2492748 A | 1/2013 |
| GB | 2499252 A | 8/2013 |
| JP | 2001-169405 A | 6/2001 |
| JP | 2006-352954 A | 12/2006 |
| JP | 2011-31698 A | 2/2011 |
| JP | 2011-244511 A | 12/2011 |
| WO | WO 2012/110658 A1 | 8/2012 |
| WO | WO 2012/127674 A1 | 9/2012 |
| WO | WO 2015/129697 A1 | 9/2015 |

OTHER PUBLICATIONS

Patents Act 1977: Combined Search and Examination Report under Sections 17 and 18(3), UKIPO Application No. GB1508962.6, dated Nov. 30, 2015, 6 pp.

Patents Act 1977: Combined Search and Examination Report under Sections 17 and 18(3), UKIPO Application No. GB1708719.8, dated Jul. 12, 2017, 5 pp.

International Search Report and Written Opinion of the International Searching Authority, International Application No. PCT/EP2016/060861, dated Aug. 24, 2016, 10 pp.

First Office Action and English language translation, CN Application No. 201680030021.5, dated Sep. 20, 2019, 21 pp

* cited by examiner

CONTROL SYSTEM AND METHOD OF CONTROLLING A DRIVELINE

RELATED APPLICATIONS

This application is a 35 U.S.C. § 371 national stage application of PCT Application No. PCT/EP2016/060861, filed on May 13, 2016, which claims priority from Great Britain Patent Application No. 1508962.6, filed on May 26, 2015, the contents of which are incorporated herein by reference in their entireties. The above-referenced PCT International Application was published in the English language as International Publication No. WO 2016/188775 A1 on Dec. 1, 2016.

INCORPORATION BY REFERENCE

The entire contents of co-pending UK patent application GB1202427.9 (publication number GB2499252), UK patents GB2325716, GB2308415, GB2341430, GB2382158, GB2492748, GB2492655 and GB2381597 and US2003/0200016 are expressly incorporated herein by reference.

TECHNICAL FIELD

The present disclosure relates to a control system and method of controlling a driveline and particularly, but not exclusively, to a controller and a method for controlling a vehicle driveline or a driveline component such as a transmission. Aspects of the invention relate to a controller, to a transmission, to a vehicle and to a method.

BACKGROUND

It is known to provide a motor vehicle having a four wheel drive mode of operation in which motive power is supplied to each of two pairs of wheels of the vehicle. Each pair of wheels may be considered to form part of an axle, the vehicle having a front axle and a rear axle. Motive power is supplied to the wheels by means of a driveline.

Some known vehicles are arranged such that motive power is permanently supplied to both axles. Some other vehicles are arranged such that motive power is selectively supplied to either only one axle or to both axles. A driver operable selector may be provided to allow the driver to select two wheel (single axle) and four wheel (two axle) operation.

Some driveline systems require the vehicle to be stationary when transitioning between two and four wheel drive modes. Such systems may be referred to as static disconnect/reconnect systems.

GB2407804 discloses a dynamic driveline reconnect arrangement in which reconnection of the wheels of one axle to the driveline following disconnection of the wheels of that axle may be undertaken when the vehicle is moving. Such a system may be referred to as a dynamic driveline reconnect system. The system disclosed in GB2407804 employs clutch arrangements to enable dynamic driveline reconnection.

In some known dynamic driveline reconnect systems the vehicle is operable automatically to disconnect the driveline from two of the wheels when a prescribed condition is met so that the vehicle operates in a two wheel drive mode. The system automatically reconnects the driveline to enable four wheel drive operation when the prescribed condition is not met.

It is an aim of embodiments of the present invention to at least partially mitigate the disadvantages of known dynamic driveline systems.

STATEMENT OF THE INVENTION

Embodiments of the invention may be understood by reference to the appended claims.

Aspects of the invention provide a control system, a driveline, a powertrain, a motor vehicle, a method, a carrier medium, a computer program product, a computer readable medium and a processor.

In an aspect of the invention for which protection is sought there is provided a control system configured to control a driveline of a motor vehicle to operate in a selected one of a plurality of configurations. The system may be configured to receive a signal indicative of an amount of brake force demanded of a braking system. The system may be configured to cause the driveline to operate in a configuration selected in dependence at least in part on the signal indicative of the amount of brake force demanded of the braking system.

In a further aspect of the invention for which protection is sought there is provided a control system configured to control a driveline of a motor vehicle to operate in a selected one of a plurality of configurations. The system may be configured to receive a brake signal responsive to the application of a braking system, the brake signal being indicative of the amount of brake force demanded of the braking system. The system may be configured to cause the driveline to operate in a configuration selected in dependence at least in part on the brake signal.

This feature has the advantage that the driveline may be placed in a configuration that is advantageous for vehicle operation according to at least one metric. For example the configuration may be advantageous for improved vehicle performance whilst braking in some embodiments.

In an aspect of the invention for which protection is sought there is provided a control system configured to control a driveline of a motor vehicle to operate in a selected one of a plurality of configurations. The system may be configured to receive a brake signal responsive to the application of a braking system. The system may be configured to cause the driveline to operate in a second configuration and not a first configuration in dependence at least in part on the brake signal. In the first configuration a first group of one or more wheels and in addition a second group of one or more wheels may be arranged to be driven by the driveline and in the second configuration the first group of one or more wheels and not the second group may be arranged to be driven by the driveline.

The vehicle may have a driveline arranged to drive two groups each of two wheels, the first configuration corresponding to a four wheel drive mode of operation and the second configuration corresponding to a two wheel drive mode of operation.

This feature has the advantage that the driveline may cause the second group of one or more wheels to provide increased brake force in certain situations, for example where a driver has released an accelerator pedal of a vehicle and has depressed a brake pedal in order to reduce vehicle speed. The control system may for example cause the driveline to provide driveline braking such as engine braking or braking by means of an electric machine coupled to the driveline. In some embodiments, regenerative braking may be employed whereby wheels connected to the driveline cause one or more electric machines coupled to the driveline to generate electrical current for storage in a charge storage device such as a battery or capacitive storage device.

It is to be understood that, when the driveline is operated in the second configuration, driveline braking of the one or more wheels of the second group cannot take place. Accordingly, an alternative braking system, if available, must be used to cause said one or more wheels to deliver brake force. Typically, a friction-based foundation braking system is available to brake the wheels of the first and second groups. However, the total amount of brake force available to brake the wheels may be enhanced, and/or the amount of brake force required of the foundation braking system reduced, by coupling the second group of one or more wheels to the driveline in addition to the first group such that the second group of one or more wheels may experience driveline braking in addition to the first group.

In some vehicles, a front to rear brake force split of 70:30 or 60:40 in favour of the front wheels is typically employed. This phenomenon may be referred to as front brake bias. It is to be understood that, in some embodiments, if the driveline is in the second configuration and a driver initiates braking, for example by depressing a brake pedal, the control system may cause the driveline to assume the first configuration and cause an electric machine coupled to the driveline to be operated as a generator to develop electrical charge and thereby apply negative torque to the driveline whilst the vehicle is moving, thereby enabling brake force to be generated by wheels of the vehicle that are coupled to the driveline. The amount of braking that a friction braking system would be required to develop in order to provide sufficient brake force in a given situation may therefore be reduced by causing the driveline to assume the first configuration and initiating driveline braking, generating useful electrical charge that may be stored.

Advantageously, the brake signal may be indicative of at least one selected from amongst an amount of pressure applied to a brake control by a driver, and a position of a driver actuated brake control.

It is to be understood that the brake signal may be generated in response to actual actuation of a brake control by a driver. Alternatively the brake signal may be generated by a speed control system such as a highway cruise control system, being referred to as a virtual brake signal since it is not generated in response to user actuation of a brake control but is equivalent to user actuation of a brake control such as depression of a brake pedal. It is to be understood that 'adaptive' or 'active' cruise control systems may be configured to cause actuation of a braking system in order The control system may be configured to cause the driveline to operate in the first configuration if the brake signal is indicative that the amount of pressure applied to the brake control exceeds a predetermined pressure amount or the position of the brake control indicates the amount of travel of the brake control with respect to an allowable range of travel exceeds a predetermined travel amount.

It is to be understood that, in the case that the brake signal is generated by a speed control or other system the control system may be configured to cause the driveline to operate in the first configuration if the brake signal is indicative of a virtual amount of pressure applied to the brake control that exceeds a predetermined amount or that a virtual position of the brake control exceeds a predetermined amount of travel with respect to an allowable range of travel.

Optionally, the brake control signal is indicative at least in part of an amount of brake force demanded of a braking system.

Optionally, the control system is configured to cause the driveline to operate in the first configuration if the brake signal indicates the amount of demanded brake force exceeds a predetermined amount of demanded brake force.

Optionally, the predetermined amount of demanded brake force is determined at least in part in dependence on an amount of longitudinal acceleration experienced by the vehicle.

The predetermined amount of demanded brake force may be determined in dependence at least in part on the average amount of longitudinal acceleration experienced over a predetermined period of time in some embodiments. Alternatively the predetermined amount of demanded brake force may be determined in dependence at least in part on an instant amount of longitudinal acceleration, i.e. the prevailing amount of longitudinal acceleration at a given moment in time.

Optionally, the predetermined amount of demanded brake force is determined at least in part in dependence on an inclination of a driving surface.

In some embodiments the predetermined amount of demanded brake force may be higher when a vehicle is travelling uphill, or on substantially level terrain, compared with when a vehicle is travelling downhill. The predetermined amount of demanded brake force may be higher when a vehicle is travelling uphill, or on substantially level terrain, compared with that when a vehicle is travelling downhill, where the second group of one or more wheels are leading wheels. This is at least in part because when a vehicle is travelling downhill a distribution of weight on wheels of a vehicle tends to shift in favour of increased weight on the leading wheels, which are located downhill of the trailing wheels. Accordingly it is desirable to increase the amount of driveline braking of the wheels in order to reduce the amount of friction braking that the braking system is required to provide.

It is to be understood that, in some vehicles, a friction braking system may be biased to provide increased brake force to front wheels of a vehicle compared with rear wheels because a forward weight shift typically occurs when a vehicle is braking, regardless of the inclination of the driving surface. It may be particularly useful to assume the first configuration of the driveline in vehicles in which the second group of wheels correspond to leading wheels so that increased powertrain (or driveline) braking may be enjoyed during braking.

The predetermined amount of demanded brake force may be arranged to decrease as a function of increasing downhill gradient and/or increase as a function of increasing uphill gradient.

Optionally, the predetermined amount of demanded brake force is arranged to increase as a function of increasing downhill gradient and/or decrease as a function of increasing uphill gradient.

Optionally, the predetermined amount of demanded brake force is determined at least in part in dependence on a parameter indicative of a coefficient of surface friction between one or more wheels and a driving surface.

Optionally, the predetermined amount of demanded brake force is arranged to be increase as a function of increasing value of coefficient of surface friction.

Thus, the predetermined amount of demanded brake force causing a transition to the first configuration may be arranged to be lower for lower values of coefficient of surface friction and higher for higher values thereof.

Optionally, the predetermined amount of demanded brake force is determined at least in part in dependence on a signal indicative of a selected driving mode in which the vehicle is operating, the driving mode being selected from a plurality of driving modes.

Optionally, the signal indicative of the driving mode in which the vehicle is operating corresponds to a state of a manual driving mode selector input device or is a signal indicative of a driving mode selected automatically by automatic driving mode selection means.

The automatic driving mode selection means may comprise a controller configured automatically to determine the most appropriate driving mode at a given moment in time.

The driving modes may correspond to respective different driving conditions for a vehicle.

The control system may have a subsystem controller for initiating control of at least one vehicle subsystem in a selected one of a plurality of subsystem configuration modes of that system, the subsystem configuration mode being selected in dependence on the selected driving mode.

Optionally, in each driving mode the system may be configured to cause the at least one vehicle subsystem to be operated in a subsystem configuration mode appropriate to the driving condition.

Optionally, each driving mode has a corresponding subsystem configuration mode of at least one vehicle subsystem selected from amongst an engine management system, a transmission system, a steering system, a brakes system and a suspension system.

The subsystem configuration modes of at least one driving mode may be selected from amongst:
 a subsystem configuration mode of a suspension system, the plurality of subsystem configuration modes of the suspension system comprising a plurality of ride heights;
 a subsystem configuration mode of a fluid suspension system in which fluid interconnection can be made between suspensions for wheels on opposite sides of the vehicle, the plurality of subsystem configuration modes of the fluid suspension system providing different levels of said interconnection;
 a subsystem configuration mode of a steering system which can provide steering assistance, the plurality of subsystem configuration modes of the steering system providing different levels of said steering assistance;
 a subsystem configuration mode of a brakes system which can provide braking assistance, the plurality of subsystem configuration modes of the brakes system providing different levels of said braking assistance;
 a subsystem configuration mode of a brake control system which can provide an anti-lock function to control wheel slip, the plurality of subsystem configuration modes of the brake control system allowing different levels of said wheel slip;
 a subsystem configuration mode of a powertrain system which includes a powertrain control means and an accelerator or throttle pedal, the subsystem configuration modes of the powertrain system providing different levels of responsiveness of the powertrain control means to movement of the accelerator or throttle pedal;
 a subsystem configuration mode of a traction control system which is arranged to control wheel spin, the plurality of subsystem configuration modes of the traction control system allowing different levels of said wheel spin;
 a subsystem configuration mode of a yaw control system which is arranged to control vehicle yaw, the plurality of subsystem configuration modes of the yaw control system allowing different levels of divergence of said vehicle yaw from an expected yaw;
 a subsystem configuration mode of a range change transmission, the subsystem configuration modes of the range change transmission including a high range mode and a low range mode of said transmission; and
 a subsystem configuration mode of a transmission system operable in a plurality of transmission ratios and including a transmission control means arranged to monitor at least one parameter of the vehicle and to select the transmission ratios in response, the subsystem configuration modes of the transmission system including a plurality of transmission configuration modes in which the transmission ratios are selected differently in response to said at least one parameter.

The powertrain control means may comprise a powertrain controller. The transmission control means may comprise a transmission controller.

Optionally, the predetermined amount of demanded brake force is determined at least in part in dependence on a parameter indicative of a state of charge of an electrical energy storage device, the storage device being arranged to be recharged by a recharging system, wherein the recharging system is arranged to be driven by the driveline to provide a regenerative braking function.

Thus it is to be understood that, in some embodiments, when the driveline is in the first configuration braking of both the first and second groups of one or more wheels may be caused by the recharging system being coupled to the driveline whilst when in the second configuration braking of the first group of one or more wheels only may be caused by the recharging system. The recharging system may for example comprise one or more electric machines operated as generators. The one or more electric machines may be arranged to be coupled substantially directly to an engine of the vehicle, and may include a crankshaft-integrated motor generator (CIMG).

The energy storage device may comprise one or more of a battery, a fuel cell, and a hydrogen fuel cell.

In one aspect of the invention for which protection is sought there is provided a driveline in combination with a system according to a preceding aspect.

In one aspect of the invention for which protection is sought there is provided a powertrain comprising a driveline and a system according to a preceding aspect.

In another aspect of the invention for which protection is sought there is provided a motor vehicle comprising a driveline and a system according to a preceding aspect.

In an aspect of the invention for which protection is sought there is provided a motor vehicle comprising a body, a plurality of wheels, a powertrain to drive said wheels, the powertrain comprising a driveline and a braking system to brake said wheels, and a system according to a preceding aspect.

The control system may comprise one or more electronic controllers.

It is to be understood that the controller or controllers described herein may comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The controller may be implemented in software run on one or more processors. One or more other controllers may be implemented in software run on one or more processors, optionally the same one or more processors as the controller. Other arrangements may be useful in some embodiments.

According to a further aspect of the present invention a control system for a vehicle comprises an electronic processor having an electrical input for receiving said brake signal, and an electronic memory device electrically coupled to the electronic processor and having instructions stored therein. The processor may be configured to access the memory device and execute the instructions stored therein such that it is operable to cause the driveline to operate in a second configuration and not a first configuration in dependence at least in part on the brake signal, wherein in the first configuration a first group of one or more wheels and in addition a second group of one or more wheels are arranged to be driven by the driveline and in the second configuration the first group of one or more wheels and not the second group are arranged to be driven by the driveline.

In another aspect of the invention for which protection is sought there is provided a method of controlling a driveline of a motor vehicle to operate in a selected one of a plurality of configurations implemented by means of a control system. The method may comprise one of more of:

receiving a brake signal responsive to the application of a braking system; and causing the driveline to operate in a second configuration and not a first configuration in dependence at least in part on the brake signal, wherein in the first configuration a first group of one or more wheels and in addition a second group of one or more wheels are arranged to be driven by the driveline and in the second configuration the first group of one or more wheels and not the second group are arranged to be driven by the driveline.

Optionally, receiving a brake signal responsive to the application of a braking system comprises receiving a brake signal indicative of an amount of brake force demanded of a braking system.

In an aspect of the invention for which protection is sought there is provided a method of controlling a driveline of a motor vehicle to operate in a selected one of a plurality of configurations implemented by means of a control system, the method comprising:

receiving a brake signal indicative of an amount of brake force demanded of a braking system, and causing the driveline to operate in a configuration selected in dependence at least in part on the signal indicative of the amount of brake force demanded of the braking system.

The method may comprise causing the driveline to operate in a first configuration in which a first group of one or more wheels and in addition a second group of one or more wheels are arranged to be driven or a second configuration in which the first group of one or more wheels and not the second group are arranged to be driven by the driveline, the method comprising selecting the configuration in dependence at least in part on the signal indicative of the amount of brake force demanded of the braking system.

The method may comprise causing the driveline to operate in the first configuration if the signal indicative of the amount of brake force demanded indicates the amount of brake force demanded exceeds a predetermined amount.

In one aspect of the invention for which protection is sought there is provided a carrier medium carrying computer readable code for controlling a vehicle to carry out the method of another aspect.

In a further aspect of the invention for which protection is sought there is provided a computer program product executable on a processor so as to implement the method of another aspect.

In one aspect of the invention for which protection is sought there is provided a computer readable medium loaded with the computer program product of another aspect.

In another aspect of the invention for which protection is sought there is provided a processor arranged to implement the method of another aspect, or the computer program product of another aspect.

In a further aspect of the invention for which protection is sought there is provided a carrier medium carrying computer readable code for controlling a vehicle to carry out the method of another aspect.

In a still further aspect of the invention for which protection is sought there is provided a computer program product executable on a processor so as to implement the method of another aspect.

In another aspect of the invention for which protection is sought there is provided a computer readable medium loaded with the computer program product of another aspect.

In one aspect of the invention for which protection is sought there is provided a processor arranged to implement the method of another aspect.

Some embodiments of the present invention provide a control system configured to control a driveline of a motor vehicle to operate in a selected one of a plurality of configurations. The system may be configured to receive a brake signal responsive to the application of a braking system. The brake signal may be indicative of the amount of demanded brake force. The system may be configured to cause the driveline to operate in a four wheel drive configuration and not a two wheel drive configuration in dependence at least in part on the brake signal, optionally when the brake signal indicates the amount of demanded brake force exceeds a predetermined amount. This feature has the advantage that the vehicle may make more effective use of driveline braking, since driveline braking may be enjoyed by four wheels of the vehicle and not just two. Accordingly, a friction foundation braking system may not need to be employed, or may be employed to generate a reduced amount of braking, thus reducing wear and tear. In addition, in vehicles having a driveline configured for regenerative braking capability, use may be made of the regenerative braking capability to effect vehicle braking and generate energy such as electrical energy in the case of an electrical regenerative braking system.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described, by way of example only, with reference to the accompanying figures in which:

FIG. 3 is a schematic illustration of (a) a vehicle according to a still further embodiment of the present invention and (b) an enlarged view of a portion of the vehicle shown in (a); and FIG. 4 is a schematic illustration of (a) a vehicle according to an embodiment of the present invention and (b) an enlarged view of a portion of the vehicle shown in (a).

DETAILED DESCRIPTION

Figure 1:
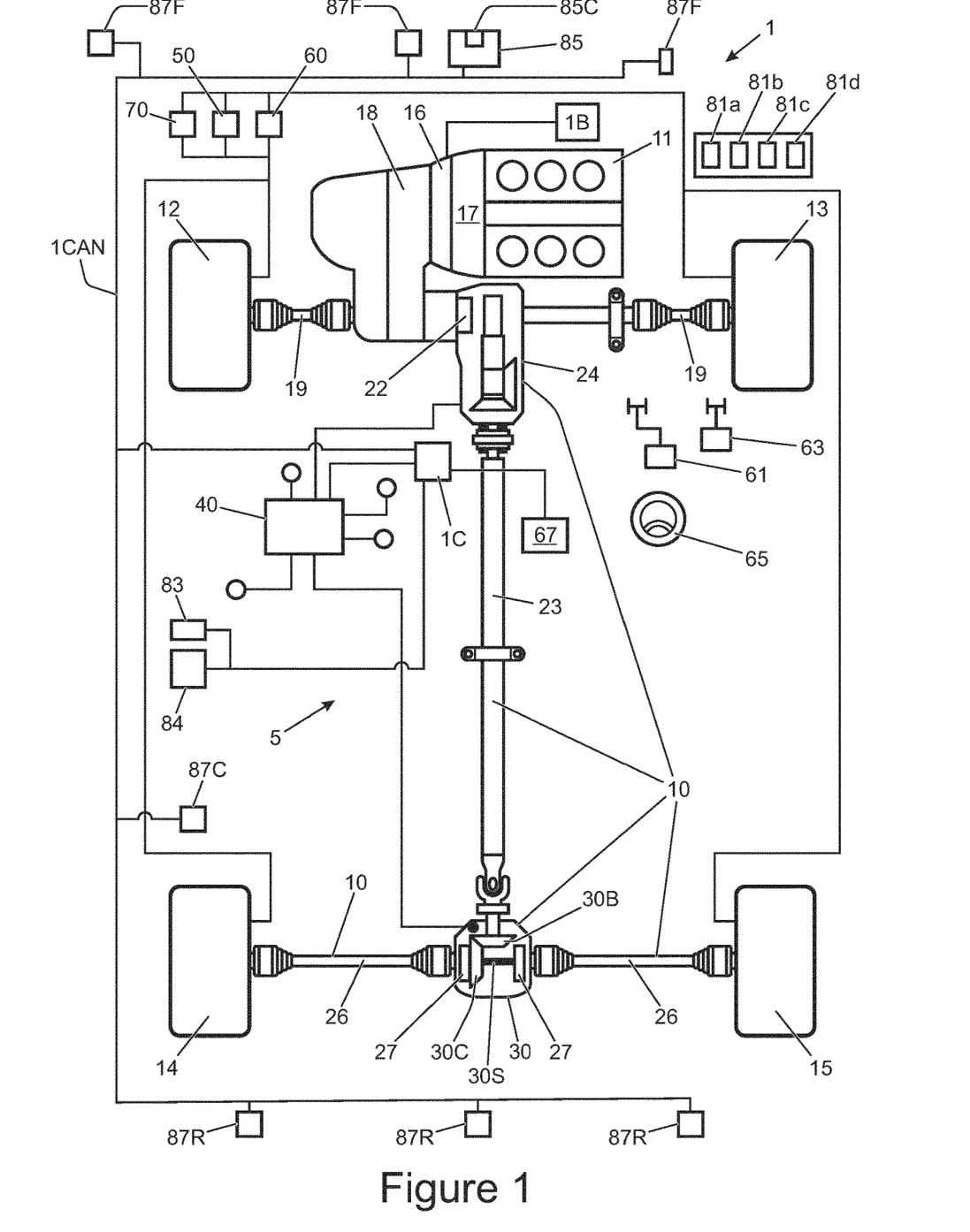
FIG. 1 is a schematic illustration of a vehicle according to an embodiment of the present invention.

A driveline 5 of a motor vehicle 1 according to an embodiment of the present invention is illustrated schematically in FIG. 1. The driveline 5 is connected to two prime mover devices by means of a gear box 18. The two prime mover means are a crankshaft-integrated motor generator (CIMG) 16 and an internal combustion engine 11. The internal combustion engine 11 is coupled to the CIMG 16 by means of a clutch device 17. The CIMG 16 is in turn coupled to an input shaft of the gearbox 18 substantially permanently although in some embodiments the CIMG 16 may be coupled to the gearbox 18 by means of a clutch device. An output shaft of the gearbox 18 is coupled to the driveline 5.

The driveline 5 has a pair of front wheels 12, 13, an auxiliary portion 10 and a pair of rear wheels 14, 15.

The driveline 5 is arranged selectively to transmit power supplied to it by the gearbox 18 from the internal combustion engine 11 and/or CIMG 16 to the front wheels 12, 13 only (in a two wheel drive mode of operation) or to the front wheels 12, 13 and the rear wheels 14, 15 simultaneously (in a four wheel drive mode of operation).

Power is transmitted from the internal combustion engine 11 and/or CIMG 16 to the front wheels 12, 13 by means of a clutch 17, a gearbox 18 and a pair of front drive shafts 19.

Power is transmitted to the rear wheels 14, 15 by means of the auxiliary portion 10 of the driveline 5. The auxiliary portion 10 has a power transfer unit (PTU) 24 having a power transfer clutch (PTC) 22 operable to connect a main drive shaft or prop shaft 23 of the auxiliary portion 10 to the gearbox 18. The prop shaft 23 is coupled in turn to a rear drive unit (RDU) 30 operable to couple the prop shaft 23 to rear drive shafts 26.

The RDU 30 has a pair of clutches 27 having input portions driven by a spool shaft 30S. The spool shaft 30S is driven by a crown gear 30C which is in turn driven by a bevel gear 30B driven by the prop shaft 23. The clutches 27 enable the RDU 30 to connect the prop shaft 23 to the rear drive shafts 26 when the four wheel drive mode of operation is required.

The driveline 5 has a controller 40 arranged to control operation of the PTU 24 and clutches 27. When a four wheel drive mode of operation is required the controller 40 is arranged to close the PTC 22 and to close clutches 27 of the RDU 30. Since the driveline 5 forms part of a powertrain, which includes the engine 11 and gearbox 18, the controller 40 may in some embodiments control the engine 11 and optionally the gearbox 18 in addition to the driveline 5 and be referred to as a powertrain controller. The controller 40 may be arranged to attempt to cause the engine 11 to develop a required amount of torque and/or to rotate at a required speed in some embodiments.

In the embodiment of FIG. 1 the PTC 22 and RDU clutches 27 have respective actuators operable to close the PTC 22 and respective clutches 27 at a selected one of a plurality of different rates. This allows the transition from the two wheel drive mode of operation to the four wheel drive mode of operation to be made at one of a corresponding plurality of different rates. It is to be understood that, in the case of a friction clutch, as the clutch is closed, a maximum amount of torque that the clutch is able to transmit from an input to an output thereof increases to a maximum transfer torque value associated with the fully closed condition. In the case of a multi-plate wet clutch the maximum amount of torque the clutch can transmit may be responsive at least in part to an amount of pressure applied to the plates of the clutch.

For the present purposes, a driveline 5 will be considered to be in the four wheel drive mode or configuration if the (non-zero) pressure applied to the plates of one or both of the clutches 27 exceeds a predetermined value, being a value higher than the value when the driveline 5 is in the two wheel drive mode or configuration. The predetermined value may be determined to be a value that will allow torque of up to a predetermined (non-zero) torque value to be transmitted by a clutch 27.

It is to be understood that the rate at which the respective actuators actuate the respective clutch arrangements may affect a rate of wear of the clutches and potentially one or more other components of the driveline 5. The rate of actuation may also impact the level of NVH (noise, vibration and harshness) experienced by a driver or passenger of a vehicle.

Recognising this, the present inventors have realised that in some circumstances it is desirable to actuate the clutches 27 of the RDU 30 and/or the PTC 22 at a reduced rate in order to reduce a rate at which the rear wheels 14, 15 and/or gearbox are connected to the prop shaft 23. This can reduce a rate of wear of components of the driveline 5 and reduce NVH associated with a transition from the first mode to the second mode.

The controller 40 of the driveline 5 is arranged to control the auxiliary driveline 10 such that slower rates of actuation of the PTC 22 and clutches 27 are employed when a requirement to assume the four wheel drive mode of operation of the driveline 5 is less urgent and higher rates of actuation are employed when the requirement to assume the four wheel drive mode is more urgent.

The vehicle 1 is provided with an antilock braking system (ABS) module 50 arranged to control a brake of one or more wheels of the vehicle to reduce an amount of braking action when required in order to prevent skidding. The vehicle 1 also has a dynamic stability control system (DSC) 60 arranged to control an amount of torque delivered to one or more wheels of the vehicle to prevent wheel slip.

Furthermore, the vehicle 1 has a traction control system (TCS) 70 arranged to monitor wheels of the vehicle 1 and to apply a brake to a wheel in the event that it is determined that the wheel is rotating at a speed that is higher than that required for substantially no wheel slip to occur.

The vehicle has a vehicle control unit (VCU) 1C that is configured to perform a number of vehicle control functions. The VCU 1C receives input signals from a number of vehicle sensors. The sensors (not shown) include sensors which provide continuous sensor outputs to the VCU 1C, including wheel speed sensors, an ambient temperature sensor, an atmospheric pressure sensor, tyre pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of a stability control system (SCS)), a brake pedal position sensor, an acceleration pedal position sensor and longitudinal, lateral, vertical motion sensors.

In some other embodiments, only a selection of the aforementioned sensors may be used. The vehicle 1 is also provided with a plurality of sensors which provide discrete sensor outputs to the VCU 1C, including a transfer box or PTU status signal (indicating whether a gear ratio of the PTU 24 is set to a HI range or a LO range), a TCS signal and a DSC signal. It is to be understood that the TCS and DSC signals each provide an indication as to whether the TCS or DSC systems 70, 60 are currently intervening to control application of brake torque and/or powertrain torque to one or more wheels, as appropriate, to improve vehicle stability.

The vehicle 1 has a camera module 85 having a forward facing video camera 85C that is configured to provide a live video feed to the VCU 1C. One or more rear facing cameras may be provided in some embodiments. The vehicle 1 also has three forward radar transmit/receive modules 87F and three rear radar transmit/receive modules 87R. The forward and rear modules 87F, 87R are configured to transmit radar waves and to detect transmitted waves that are reflected by objects ahead of and behind the vehicle 1, respectively. Signals generated by the modules 87F, 87R are fed to a radar control module 87C via vehicle controller area network (CAN) bus 1CAN. The radar control module 87C is configured to process the signals received and provide an output to the VCU 1C indicative of the distance of detected objects from the vehicle and their relative direction from the vehicle 1. It is to be understood that other numbers of forward and/or rear facing radar modules 87F, 87R may be employed in some embodiments. In some embodiments only one or more front facing modules 87F may be provided, or one or more rear facing modules 87R.

The vehicle 1 also has a radio module 83 configured to receive a live traffic data signal from a traffic data service, and a live weather data signal from a weather data service. The module 83 processes the data and outputs the data to the VCU 1C. A location determining system in the form of a global positioning system (GPS) module 84 is also provided that is configured to determine the geographical location of the vehicle 1 by reference to GPS satellite signals. In some embodiments an alternative system for determining vehicle location may be employed such as a general packet radio service (GPRS) module. The VCU 1C is provided with navigation aid functionality. The VCU 1C is configured to allow a user to input an intended destination of the vehicle 1, in response to which the VCU 1C is configured to calculate an optimum route of travel to the intended destination and to provide navigation instructions to the user to enable the user to follow the optimum route.

The vehicle 1 has five subsystems that may be caused by the VCU 1C to operate in one of a plurality of different subsystem configuration modes in order to provide different vehicle performance characteristics such that the vehicle may be operated in a predetermined one of a plurality of different driving modes. Thus, the VCU 1C causes each of the plurality of vehicle subsystems 81*a*-*d*, 50 to operate in the subsystem configuration mode appropriate to the selected driving mode. In the present embodiment the subsystems 81*a*-*d*, 50 are an engine management system 81*a*, a transmission control system 81*b*, an electronic power assisted steering unit 81*c* (ePAS unit), ABS module 50 and a suspension control system 81*d*.

In the present embodiment, the VCU 1C is configured to operate the subsystems according to the driving mode that has been selected either manually by a user by means of a selector dial provided in a switchpack 67 accessible to the driver whilst driving, or automatically by the VCU 1C in response at least in part to signals received from various sensors on the vehicle 1. In the automatic mode of driving mode selection, the VCU 1C selects the driving mode according to the type of terrain in which the vehicle 1 is operating as determined by reference at least in part to the signals received from the sensors, as described in UK patent GB2492655 referred to above.

The driving modes include a grass/gravel/snow driving mode (GGS mode) that is suitable for when the vehicle is travelling in grass, gravel or snow terrain, a mud/ruts driving mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode) which is a suitable compromise mode, or general mode, for all terrain conditions and especially vehicle travel on motorways and regular roadways. The SP OFF mode may also be referred to as an 'on-road' or 'on-highway' driving mode. Many other driving modes are also envisaged.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

The manner in which the VCU 1C is configured to cause the subsystems 81*a*-*d*, 50 to operate in different respective driving modes is described in more detail in UK patent GB2492655 referred to above.

Although five subsystems 81*a*-*d*, 50 are illustrated as being under the control of the VCU 1C, in practice a greater number of vehicle subsystems 81*a*-*d*, 50 may be included on the vehicle 1 and may be under the control of the VCU 1C. The VCU 1C includes a subsystem control module which provides control signals to each of the vehicle subsystems 81*a*-*d*, 50 to cause each subsystem 81*a*-*d*, 50 to operate in the subsystem configuration mode corresponding to the selected driving mode. Thus, each subsystem 81*a*-*d*, 50 may be caused to operate in a manner appropriate to the driving condition, such as the terrain or driving surface, in which the vehicle 1 is travelling (referred to as the terrain condition). The subsystems 81*a*-*d*, 50 also communicate with the subsystems control module of the VCU 1C to feed back information on subsystem status.

It is to be understood that in the present embodiment the controller 40 is operable to control the driveline 5 to assume the four wheel drive mode in dependence on the driving mode in which the VCU 1C is causing the vehicle 1 to operate. In the present embodiment, the controller 40 causes the driveline 5 to operate in the four wheel drive mode when the VCU 1C is operating in a driving mode other than the on-highway driving mode. When the VCU 1C is operating in the on-highway driving mode the VCU 1C causes the controller 40 to cause the driveline to operate in the two wheel drive or four wheel drive mode according to an active driveline control strategy.

In the present embodiment, when operating in the on-highway driving mode the controller 40 is arranged to cause the driveline 5 to operate in the two wheel drive mode at speeds above a predetermined upper threshold speed for four wheel drive operation, v_U4WD. In the case that the driveline 5 is in the four wheel drive mode and the speed exceeds v_U4WD, the controller 40 causes the driveline 5 to assume the two wheel drive mode. This feature has the advantage that the vehicle 1 will typically consume less fuel, and may also emit a lower amount of unwanted combustion products compared with continued operation in the four wheel drive mode above v_U4WD. In the present embodiment the value of v_U4wd is set to a value of 35 kph although other values may be useful in some embodiments such as 30 kph, 40 kph or any other suitable value.

If the driveline 5 is in the two wheel drive mode and the vehicle speed falls below a predetermined lower threshold speed for four wheel drive operation, v_L4WD, the controller 40 causes the driveline 5 to switch from the two wheel drive mode to the four wheel drive mode. In the present embodiment, v_L4WD is set to a value of 12 kph although other values may be useful in some embodiments such as 10 kph, 15 kph, 20 kph, 25 kph or any other suitable value. It is to be understood that, since v_L4WD<v_U4WD, hysteresis is present in respect of the speeds at which transitions between the two and four wheel drive modes occur. This feature has the advantage that it reduces the risk of mode chattering which might otherwise occur if v_L4WD were substantially equal to v_U4WD and the vehicle speed was to oscillate between speeds above and below v_L4WD in relatively rapid succession.

In the present embodiment, the engine management system 81a is configured to control the delivery of drive torque to the driveline 5 by the engine 11 and CIMG 16 according to a powertrain control strategy that is intended to reduce the amount of carbon dioxide emitted by the vehicle during a given drivecycle. The engine management system 81a is operable to cause the CIMG 16 to operate as a motor and provide positive drive torque to the driveline 5, or as a generator and provide negative torque to the driveline 5, and in addition to switch the engine 11 on and off, under the control of the VCU 1C. The VCU 1C determines whether to operate the CIMG 16 as a motor or generator (or neither) and whether to maintain the engine 11 in an on or off condition according to the powertrain control strategy.

The vehicle 1 has a battery module 1B that includes an inverter that is electrically connected to the CIMG 16 so as to supply power to drive the CIMG 16 as a motor when required, and to receive charge generated by the CIMG 16 when operated as a generator. Under the powertrain control strategy, the VCU 1 determines which of the following powertrain modes the vehicle should operate in at a given moment:

(a) a parallel boost hybrid mode in which the CIMG 16 and engine 11 provide positive drive torque to the driveline 5 in response to powertrain torque demand substantially simultaneously;

(b) a parallel recharge hybrid mode in which the CIMG 16 is driven as a generator whilst the engine 11 provides positive drive torque to the driveline 5 in response to powertrain torque demand whereby the battery module 1B may be recharged by the CIMG 16;

(c) an electric vehicle (EV) mode in which the engine 11 is switched off and the CIMG 16 alone provides positive drive torque to the driveline 5 in response to powertrain torque demand; and (d) a hybrid inhibit mode in which the CIMG 16 is not operated as a motor and not operated as a generator, the engine 11 remaining switched on during the course of a given drive cycle to provide positive drive torque as required.

When the driveline 5 is operating in the two wheel drive mode, the VCU 1C is configured to monitor a signal generated by the ABS module 50 indicative of the amount of brake torque being demanded of the braking system at a given moment in time. It is to be understood that brake torque may be demanded of the braking system in response to driver depression of brake pedal 61 or by an adaptive or active speed control system that is capable of causing actuation of the braking system. The vehicle 1 may for example be equipped with an on-highway active cruise control system and/or off-road speed control system, either of which may be configured to command positive powertrain torque and negative brake torque as required. In some embodiments, one or more other vehicle systems may be configured to communicate with the ABS module 50 and demand that the braking system be applied to one or more wheels, in addition or instead.

If the controller 40 is causing the driveline 5 to operate in the two wheel drive mode, the VCU 1C is configured repeatedly to determine whether a transition to the four wheel drive mode should be made. The transition to the four wheel drive mode may be advantageous in enabling an increase in the amount of charge that may be generated by the CIMG 16 when driven as a generator by the driveline 5 to effect regenerative braking of the vehicle 1. This may also have the benefit of reducing wear of friction brakes of the vehicle associated with the braking system.

The VCU 1C is configured to determine whether to cause the driveline 5 to assume the two wheel drive mode in response to the signal indicative of the amount of brake torque being demanded of the braking system with reference to the following parameters:

(a) the amount of brake torque being demanded;
(b) vehicle speed;
(c) longitudinal acceleration of the vehicle;
(d) driving surface inclination;
(e) surface coefficient of friction between wheels of the vehicle and the driving surface;
(f) the driving mode in which the vehicle is operating;
(g) the powertrain mode in which the vehicle is operating;
(h) the state of charge (SOC) of the vehicle battery 1B; and
(i) a signal indicative of the probability that the vehicle is slowing to a halt or relatively low speed at a given moment in time.

In the present embodiment, a transition to the four wheel drive mode in response to a brake torque demand is prohibited if the VCU 1C is causing the vehicle to operate in the hybrid inhibit powertrain mode, or if the SOC of the battery 1B exceeds a predetermined amount. In the present embodiment the predetermined SOC is 100% of the maximum allowable SOC in normal use of the vehicle 1. Other values may be useful in some embodiments, such as 95%, 90% or any other suitable value. It is to be understood that the maximum allowable SOC in normal use may be less than the actual maximum capacity of the battery 1B in order to increase a service life of the battery 1B. Similarly, the minimum allowable SOC in normal use may be greater than the actual absolute minimum SOC that the battery 1B may attain, in order to increase a service life of the battery 1B.

Similarly, in some driving modes a transition to the four wheel drive mode may be prohibited in response to brake torque demand, for example in order to avoid, reduce or prevent noise, vibration or harshness (NVH) associated with the transition to the four wheel drive mode.

In the present embodiment, the VCU 1C is configured to command a transition to the four wheel drive mode if the brake torque demand exceeds a predetermined amount brk_tq_crit and, in addition, vehicle reference speed v_ref exceeds a predetermined value v_ref_crit.

The value of brk_tq_crit is determined by reference to the value of a parameter long_acc indicative of vehicle longitudinal acceleration, a parameter surface_incl indicative of driving surface inclination and a parameter surface_mu indicative of the coefficient of friction—between wheels of the vehicle and the driving surface.

It is to be understood that the value of brk_tq_crit is arranged to vary in dependence on the value of long_acc. In the present embodiment, the value of brk_tq_crit is such that the value is lower when a vehicle 1 is experiencing higher rates of deceleration compared with lower rates of deceleration. This is in order to take advantage of the increased weight shift to front wheels of a vehicle when higher deceleration rates are experienced.

The value of surface_incl is higher for steeper uphill inclination and lower for steeper downhill inclination. In the present embodiment, the value of brk_tq_crit is arranged to be lower when a vehicle is travelling uphill, i.e. for higher values of surface_incl, and when driving on substantially level terrain, compared with when a vehicle is travelling downhill. The value of brk_tq_crit is arranged to decrease with increasing positive gradient of the driving surface, i.e. with increasingly steep uphill gradient, and to increase with increasingly steep downhill gradient. In some alternative embodiments, the value of brk_tq_crit may be arranged to be higher when a vehicle is travelling uphill, i.e. for higher values of surface_incl, and when driving on substantially level terrain, compared with when a vehicle is travelling downhill. The value of brk_tq_crit may be arranged to increase with increasing positive gradient of the driving surface, i.e. with increasingly steep uphill gradient, and to decrease with increasingly steep downhill gradient. Other arrangements may be useful in some embodiments.

The value of parameter surface_mu is arranged to vary from a value of substantially zero, indicative of a relatively slippery surface corresponding to wet ice, to a value of unity indicative of a relatively high grip surface such as dry asphalt. The value of brk_tq_crit is arranged to be lower for surfaces having lower values of surface_mu due to the reduced amount of braking torque that may be applied to a given axle compared with surfaces having higher values of surface_mu before excessive slip of one or more wheels of the axle occurs.

In the present embodiment the VCU 1 is also configured to generate a probability signal indicative of the value of a parameter prob_halt that corresponds to the probability that the vehicle 1 is going to slow to a halt, or at least to a relatively slow speed, in light of prevailing traffic or traffic control signal conditions ahead of the vehicle. The VCU 1 takes the value of prob_halt into account when determining the value of brk_tq_crit.

In the present embodiment, if the value of prob_halt indicates that the vehicle 1 is likely to stop, or at least slow to a relatively slow speed, the VCU 1 raises the value of brk_tq_crit relative to the value otherwise prevailing. In some alternative embodiments, under these circumstances the VCU 1 may lower the value of brk_tq_crit relative to the value otherwise prevailing since the amount of brake torque demanded is likely to increase, rather than decrease, as the vehicle 1 continues to approach the traffic and/or traffic control signal ahead.

In order to generate the value of prob_halt the VCU 1 is configured to monitor, by means of camera module 85C and the forward radar transmit/receive modules 87F, an environment ahead of the vehicle 1. The camera module 85C generates a stream of video frame data that is processed by image recognition technology to identify the presence of vehicles and traffic control signals ahead of the vehicle 1, whilst the radar modules 87F detect objects ahead of the vehicle, referred to as 'target objects'. A radar module control portion of the VCU 1 processes data generated by the radar modules 87F and generates data indicative of the position and speed of target objects relative to the vehicle 1 as determined by the radar modules 87F.

The VCU 1C uses the data generated by the radar control portion in combination with the stream of video frame data to determine whether the vehicle 1 is approaching stationary or slow moving traffic. In the present embodiment, the VCU 1C is configured to determine, based on the video frame data, whether the brake lights of any vehicles ahead of the vehicle 1 are illuminated, indicating that the traffic may be stationary, slow moving, or slowing, and to take this into account when determining the likelihood that the vehicle 1 is going to slow to a halt or to a relatively slow speed. Thus, in the present embodiment, the VCU 1 may determine that the presence of illuminated brake lights ahead of the vehicle 1 indicates an increased likelihood that the vehicle 1 will slow to a halt or relatively slow speed.

In addition, the image recognition technology is employed to identify traffic control signals in the captured video frames and determine whether any traffic control signals identified indicate that vehicles approaching the signals must stop. If the traffic control signals do indicate that approaching vehicles must stop, the VCU 1 determines that the likelihood that the vehicle 1 is going to slow to a halt or relatively slow speed is higher than in the absence of such an indication.

In some embodiments, the VCU 1C may employ map data associated with the navigation functionality of the VCU 1C to determine the presence of junctions and/or traffic control signals ahead of the vehicle based on vehicle location information provided by the GPS module 84. The VCU 1C may correlate the map data with the information in respect of traffic and traffic control signal status obtained using the camera module 85C and radar modules 87F as described above in order more reliably to determine the probability that the vehicle 1 will slow to a halt or relatively low speed. For example, it is to be understood that the map data may in some embodiments be useful in enabling the VCU 1C to determine whether traffic detected ahead of the vehicle 1 by means of the camera module 85C or radar modules 87F is in a path of the vehicle based on road layout data and, optionally, a predicted route of the vehicle, for example based on navigation guidance information generated in response to vehicle destination data. Similarly, the map data may be useful in determining whether a given traffic control signal detected by the camera module 85C must be obeyed by the vehicle 1. This may be particularly useful at relatively complex junctions where traffic control signals controlling traffic travelling along different routes are detected in images generated by the camera module 85C.

In some embodiments the VCU 1C may, in addition or instead, receive traffic light sequencing information from a database forming part of the VCU 1 or external to the vehicle, for example via a wireless communications link such as via radio module 83. The sequencing information may be employed by the VCU 1C to determine the state of a traffic signal ahead of the vehicle 1, for example whether the signal indicates a vehicle may continue beyond a control point, being a point controlled by the traffic signal, or whether the vehicle must stop at the control point. In some embodiments the VCU 1C may predict, based on the distance of the vehicle 1 from the traffic control point and optionally information in respect of any traffic ahead of the vehicle 1, whether the vehicle 1 is likely to be required to slow to a halt or relatively low speed.

It is to be understood that the VCU 1C may also take into account traffic information received via a wireless traffic information data link such as an internet-based traffic information data link, traffic message channel (TMC) traffic information or any other suitable traffic information source. The traffic information may include information in respect of traffic density and speed at a given geographical location. The VCU 1C may be configured to decrease the value of brk_tq_crit for higher values of traffic density, for example by adjusting the probability signal to indicate an increased probability that the vehicle 1 will slow to a halt or relatively low speed, as the density of traffic increases.

It is to be understood that some embodiments of the present invention may be used with a range of different types of driveline, including drivelines in which a rear axle of a vehicle is arranged to be permanently driven whilst the front axle is arranged to be driven only when the four wheel drive mode is assumed, as well as drivelines in which a front axle is arranged to be permanently driven whilst the rear axle is arranged to be driven only when the four wheel drive mode is assumed, as in the case of the driveline 5 of the embodiment of FIG. 1.

It is to be understood that, in some embodiments, the value of brk_tq_crit may be lower in vehicles in which the rear wheels only are driven when in the two wheel drive mode. This is because a forward weight shift typically takes place when a vehicle experiences braking whilst moving in a forward direction, resulting in an increased capacity of the front wheels to effect braking and a decreased capacity of the rear wheels to effect braking.

Figure 2:
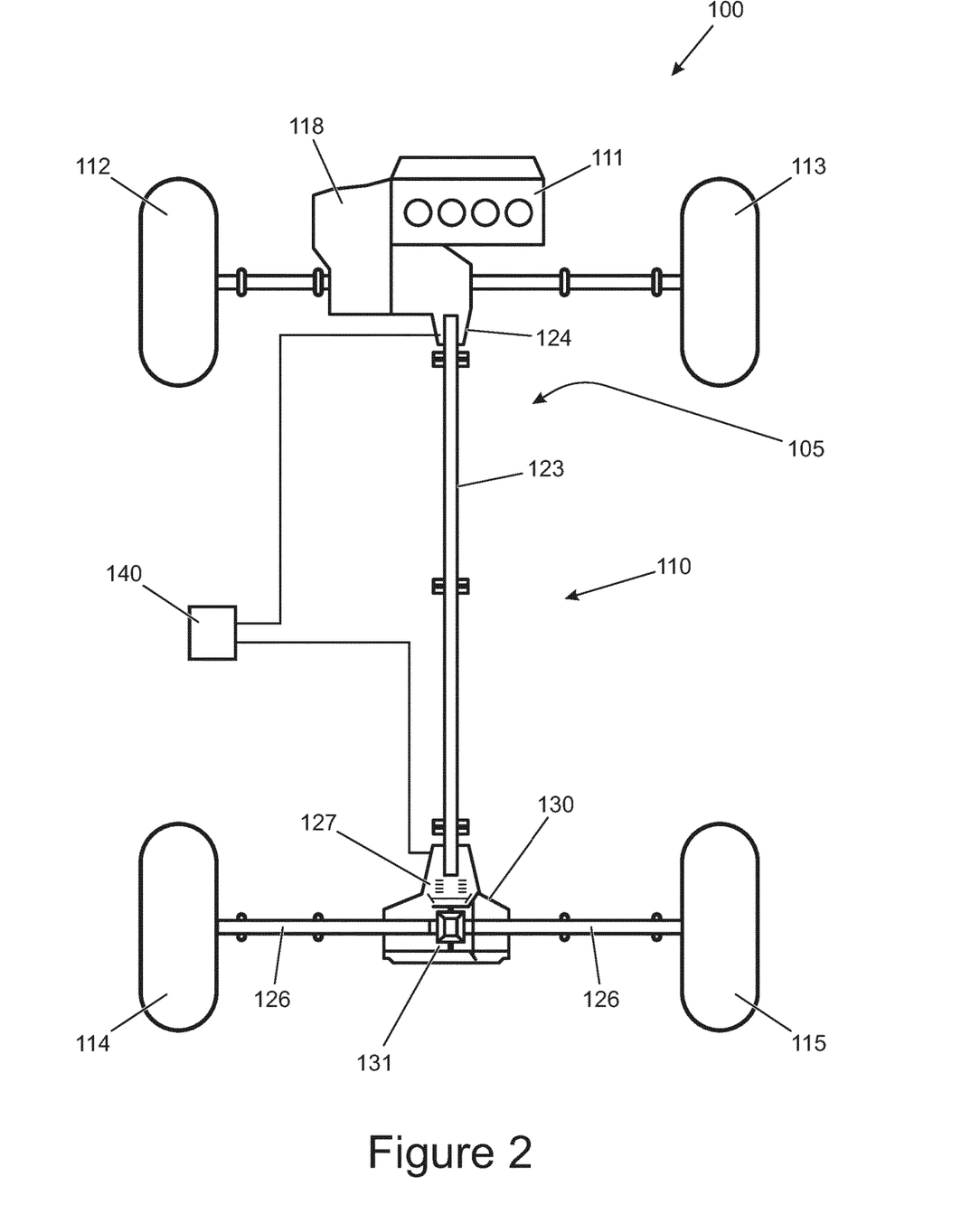
FIG. 2 is a schematic illustration of a vehicle according to a further embodiment of the present invention.

FIG. 2 illustrates a portion of a vehicle 100 according to a further embodiment of the present invention. Like features of the embodiment of FIG. 2 to those of the embodiment of FIG. 1 are shown with like reference signs incremented by 100.

The vehicle 100 has a driveline 105 having a PTU 124 having a PTC (not shown) configured to allow a prop shaft 123 to be connected to a gearbox 118. At an opposite end of the prop shaft 123, a rear drive unit 130 is provided having a clutch 127 in the form of a multi-plate wet clutch. The RDU 130 also has a differential gear arrangement 131 for driving respective left and right rear drive shafts 126. The clutch 127 is configured to connect the prop shaft 123 to an input portion of the differential gear arrangement 131. It is to be understood that the controller 140 is configured to cause the vehicle 100 to operate in the two wheel drive mode by controlling the PTU 124 to disconnect the prop shaft 123 from the gearbox 118, and controlling the clutch 127 of the RDU 130 to disconnect the prop shaft 123 from the differential 131. The controller 140 is also configured to cause the vehicle to operate in the four wheel drive mode by controlling the PTU 124 to connect the prop shaft 123 to the gearbox 118, and controlling the clutch 127 of the RDU 130 to connect the prop shaft 123 to the differential 131. In the embodiment of FIG. 2 the PTU 124 has a PTC in the form of a multi-plate wet clutch. In an alternative embodiment the PTC is in the form of a dog clutch, the PTU 124 also having a synchroniser for synchronising the speed of rotation of input and output portions of the PTC when it is required to close the dog clutch.

The driveline 105 of the embodiment of FIG. 2 is not configured to allow cross-axle lock to be applied between rear wheels 114, 115 of the driveline 5. However in some alternative embodiments means may be provided for locking the rear drive shafts 126 together such that relative rotation may be substantially prevented. For example in some embodiments the rear drive shafts 126 may be arranged to be locked together by means of a clutch arrangement.

Figure 3:
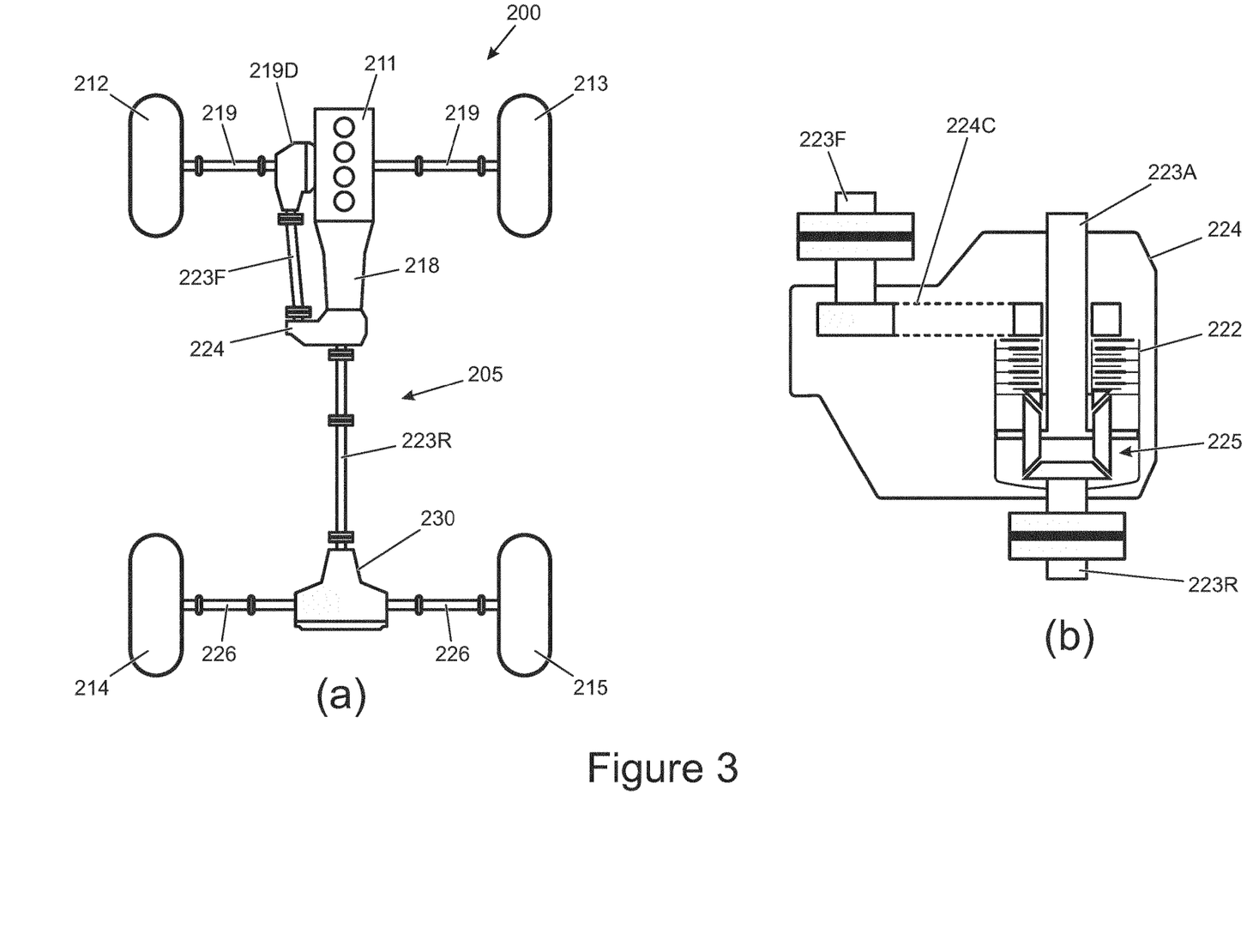

FIG. 3(*a*) illustrates a portion of a vehicle 200 according to a further embodiment of the present invention. FIG. 3(*b*) is an enlarged view of a portion of the driveline 205 of the vehicle 200 shown in (a) and shows detail in respect of PTU 224. Like features of the embodiment of FIG. 3 to those of the embodiment of FIG. 1 are shown with like reference signs incremented by 200.

The driveline 205 has a PTU input shaft 223A (FIG. 3(*b*)) that is permanently connected to a gearbox 218, a front prop shaft 223F connectable to the PTU input shaft 223A via a power transfer clutch (PTC) 222 and a rear prop shaft 223R that is connected to the PTU input shaft 223A by means of a differential gear arrangement (or 'differential') 225. In the embodiment shown the differential 225 may be referred to as a 'centre differential' or 'centre diff' and forms part of the PTU 224. The differential 225 allows the front and rear prop shafts 223F, 223R to rotate at different respective speeds.

The rear prop shaft 223R is connected to an RDU 230 that is configured to allow the rear prop shaft 223R to be connected to and disconnected from rear wheels 214, 215. In the embodiment of FIG. 3 the RDU 230 is similar to RDU 130 of the embodiment of FIG. 2 although other types of RDU may be useful such as RDU 30 of the embodiment of FIG. 1.

The PTC 222 allows the front prop shaft 223F to be releasably connected to the PTU input shaft 223A via a chain drive 224C. The PTC 222 is a multi-plate wet clutch in the embodiment of FIG. 3 although other types of clutch may be useful in some embodiments, such as a dog clutch. The front prop shaft 223F is in turn arranged to drive a pair of front drive shafts 219 via a front differential unit 219D. The front differential unit 219D has a differential gear arrangement that allows the prop shafts 219 to rotate at different respective speeds.

Figure 4:
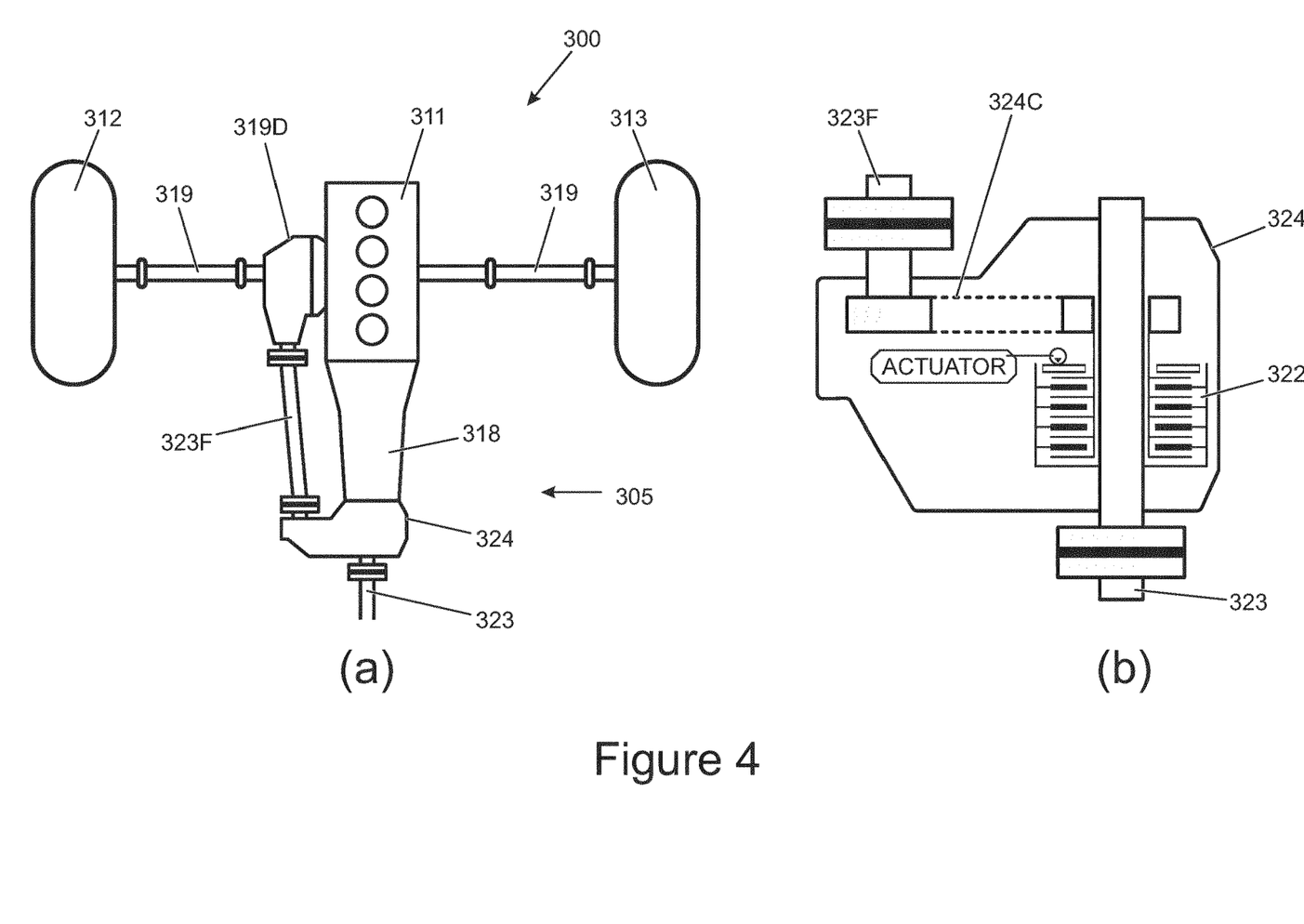

In some embodiments the PTU 224 may be provided without the differential 225. FIG. 4 shows a portion of a driveline 305 having such a PTU. Like features of the embodiment of FIG. 4 to those of the embodiment of FIG. 1 are shown with like reference signs incremented by 300.

In the arrangement of FIG. 4, a single prop shaft 323 connects gearbox 318 via PTU 324 to an RDU (not shown). The PTU 324 has a PTC 322 in the form of a multi-plate wet clutch 322 (FIG. 4(*b*)) that is configured to allow the prop shaft 323 to be connected to a front prop shaft 323F that is arranged in turn to drive a front differential unit 319D. The PTC 322 is arranged to drive the front prop shaft 323F via a chain drive 324C.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system for a vehicle, wherein the control system is configured to:
   receive a brake signal indicative of a brake force demand of a braking system of the vehicle;
   determine a probability that the vehicle is going to slow or halt based on traffic or traffic control signal conditions ahead of the vehicle;
   cause a driveline of the vehicle to operate in a first configuration and not a second configuration if the brake signal indicates an amount of demanded brake force exceeds a predetermined amount of demanded brake force, wherein the predetermined amount of demanded brake force is dependent upon the determined probability, wherein in the first configuration a first group of one or more wheels and in addition a second group of one or more wheels are arranged to be driven by the driveline, and in the second configuration the first group of one or more wheels and not the second group are arranged to be driven by the driveline; and
   control an electric machine coupled to the driveline to provide at least some of the brake force demand by applying a brake force to the first group of one or more wheels and the second group of one or more wheels if the first group of one or more wheels and the second group of one or more wheels are driven by the driveline and the driveline is operating in the first configuration.

2. The control system according to claim 1, wherein the brake signal is indicative of at least one selected from amongst an amount of pressure applied to a brake pedal by a driver, and a position of the brake pedal.

3. The control system according to claim 2, further configured to cause the driveline to operate in the first configuration if the brake signal is indicative that the amount of pressure applied to the brake control exceeds a predetermined pressure amount or the position of the brake control indicates an amount of travel of the brake control with respect to an allowable range of travel exceeds a predetermined travel amount.

4. The control system according to claim 1, wherein the predetermined amount of demanded brake force is determined at least in part in dependence on one or both of an amount of longitudinal acceleration experienced by the vehicle and an inclination of a driving surface.

5. The control system according to claim 1, wherein the predetermined amount of demanded brake force is arranged to increase as a function of increasing downhill gradient and/or decrease as a function of increasing uphill gradient, or wherein the predetermined amount of demanded brake force is arranged to decrease as a function of increasing downhill gradient and/or increase as a function of increasing uphill gradient.

6. The control system according to claim 1, wherein the predetermined amount of demanded brake force is determined at least in part in dependence on a parameter indicative of a coefficient of surface friction between one or more wheels in the first or second group of one or more wheels and a driving surface.

7. The control system according to claim 6, wherein the predetermined amount of demanded brake force is arranged to increase as a function of increasing value of the coefficient of surface friction.

8. The control system according to claim 1, wherein the predetermined amount of demanded brake force is determined at least in part in dependence on a signal indicative of a selected driving mode in which the vehicle is operating, the driving mode being selected from a plurality of driving modes.

9. The control system according to claim 8, wherein the signal indicative of the selected driving mode in which the vehicle is operating corresponds to a state of a manual driving mode selector input device or is a signal indicative of a state of an automatic driving mode selection controller.

10. The control system according to claim 8, wherein the plurality of driving modes correspond to respective different driving conditions for the vehicle.

11. The control system according to claim 8, further comprising a subsystem controller for initiating control of at least one vehicle subsystem in a selected one of a plurality of subsystem configuration modes of the at least one vehicle subsystem, the subsystem configuration mode being selected in dependence on the selected driving mode.

12. The control system according to claim 11, wherein the selected one of the plurality of subsystem configuration modes is selected from amongst:
   a plurality of ride heights of a suspension system;
   different levels of fluid interconnection between fluid suspensions on opposite sides of the vehicle;
   different levels of steering assistance provided by a steering system;
   different levels of braking assistance provided by the braking system;
   different levels of wheel slip controlled by the braking system;
   different levels of responsiveness of a powertrain controller to movement of an accelerator or throttle pedal;
   different levels of wheel spin controlled by a traction control system;
   different levels of divergence of vehicle yaw from an expected yaw controlled by a yaw control system;
   a high range mode and a low range mode of a range change transmission of the driveline; or
   a plurality of transmission configuration modes in which transmission ratios are selected differently in response to at least one parameter of the vehicle.

13. The control system according to claim 1, wherein the predetermined amount of demanded brake force is determined at least in part in dependence on a parameter indicative of a state of charge of an electrical energy storage device, the electrical energy storage device being arranged to be recharged by a recharging system, the recharging system comprising the electric machine, wherein the recharging system is arranged to be driven by the driveline to provide a regenerative braking function.

14. The control system according to claim 1, further configured to reduce a proportion of brake force provided by friction brakes of the vehicle to provide the brake force demand when the driveline transitions from the second configuration to the first configuration.

15. The control system according to claim 1, wherein the control system is configured to determine the probability that the vehicle is going to slow or halt by processing video data received from at least one camera attached to the vehicle.

16. The control system according to claim 1, wherein the control system is configured to determine the probability that the vehicle is going to slow or halt by processing radar data received from at least one radar module attached to the vehicle.

17. The control system according to claim 1, wherein the control system is configured to determine the probability that the vehicle is going to slow or halt by processing traffic data received from a traffic data service.

18. The control system according to claim 1, wherein the control system is configured to determine the probability that the vehicle is going to slow or halt by processing weather data received from a weather data service.

19. A method of controlling a driveline of a motor vehicle to operate in a selected one of a plurality of configurations implemented by a control system, the method comprising:
receiving a brake signal indicative of a brake force demand of a braking system;
determining a probability that the vehicle is going to slow or halt based on traffic or traffic control signal conditions ahead of the vehicle;
causing the driveline to operate in a first configuration and not a second configuration if the brake signal indicates an amount of demanded brake force exceeds a predetermined amount of demanded brake force, wherein the predetermined amount of demanded brake force is dependent upon the determined probability, wherein in the first configuration a first group of one or more wheels and in addition a second group of one or more wheels are arranged to be driven by the driveline, and in the second configuration the first group of one or more wheels and not the second group are arranged to be driven by the driveline; and
controlling an electric machine coupled to the driveline to provide at least some of the brake force demand by applying a brake force to the first group of one or more wheels and the second group of one or more wheels if the first group of one or more wheels and the second group of one or more wheels are driven by the driveline and the driveline is operating in the first configuration.

20. A method of controlling a driveline of a motor vehicle to operate in a selected one of a plurality of configurations implemented by a control system, the method comprising:
receiving a brake signal indicative of an amount of brake force demanded of a braking system;
determining a probability that the vehicle is going to slow or halt based on traffic or traffic control signal conditions ahead of the vehicle;
causing the driveline to operate in the selected one of the plurality of configurations if the amount of brake force demanded of the braking system indicated by the brake signal exceeds a predetermined amount of demanded brake force, wherein the predetermined amount of demanded brake force is dependent upon the determined probability, wherein, in the selected one of the plurality of configurations, a first group of one or more wheels and a second group of one or more wheels are driven by the driveline; and
controlling an electric machine coupled to the driveline to provide at least some of the brake force demand by applying a brake force to the first group of one or more wheels and to the second group of one or more wheels.

* * * * *